Aug. 17, 1965 P. HUTT 3,201,564
CONTROL SYSTEM FOR ELECTRIC COOKING OVENS
Filed Dec. 11, 1962 2 Sheets-Sheet 1
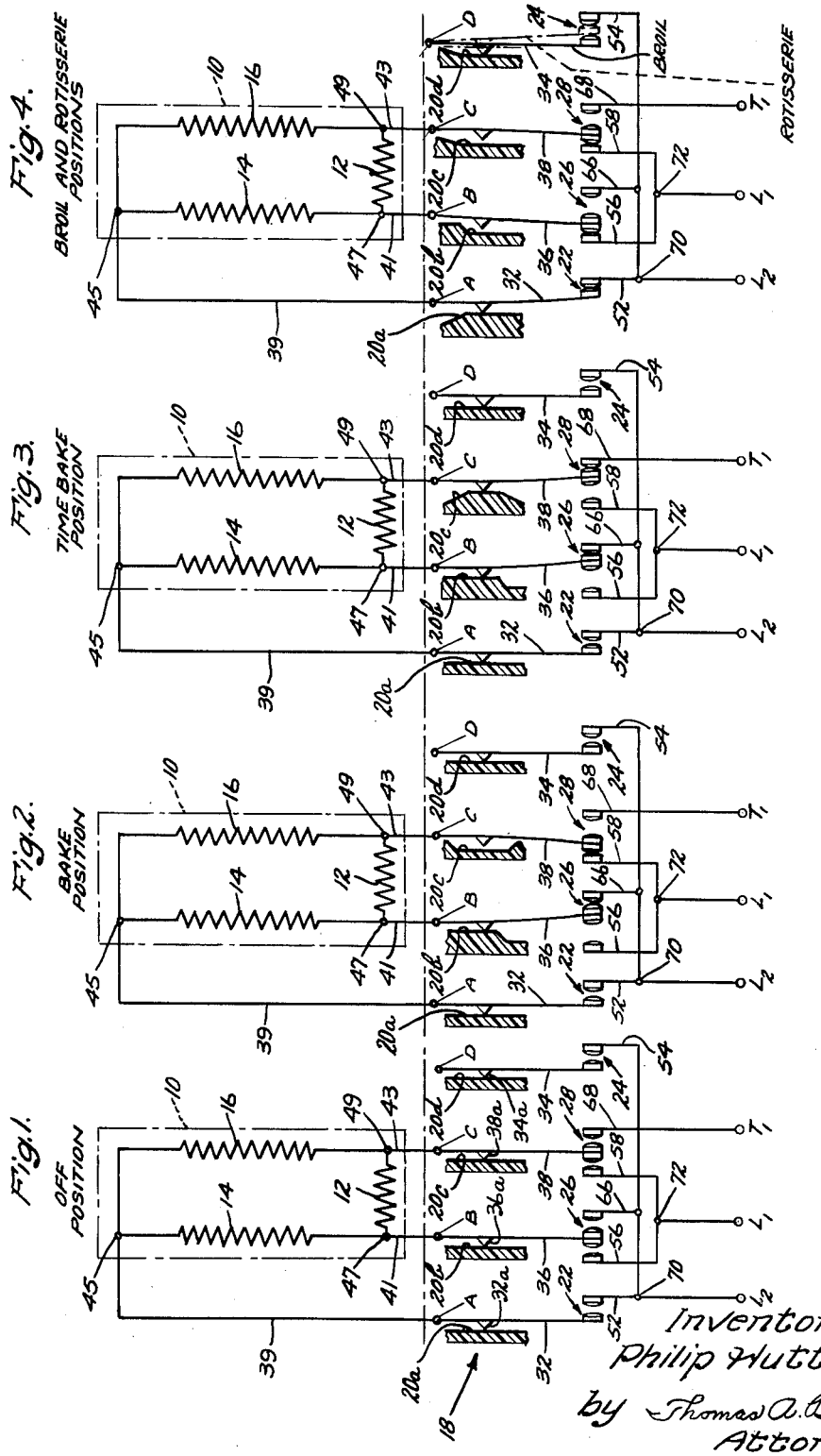
Inventor:
Philip Hutt,
by Thomas A. Briody
Attorney Aug. 17, 1965  P. HUTT  3,201,564
CONTROL SYSTEM FOR ELECTRIC COOKING OVENS
Filed Dec. 11, 1962  2 Sheets-Sheet 2
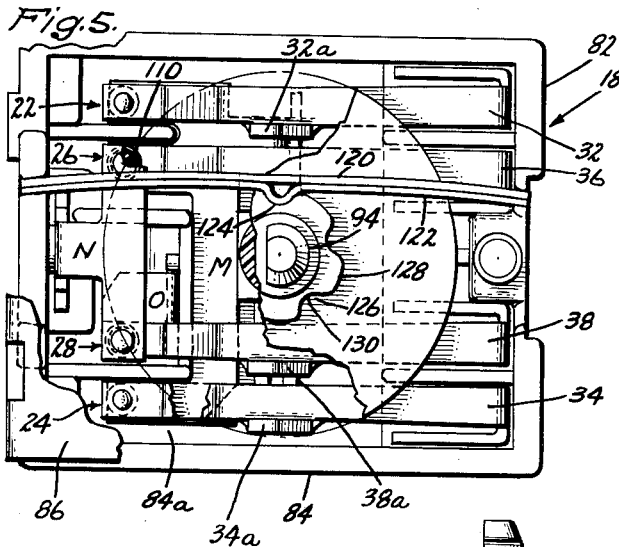
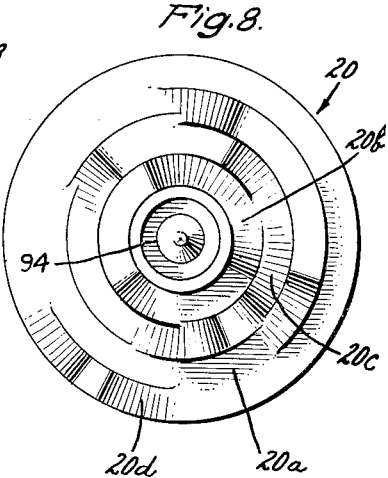
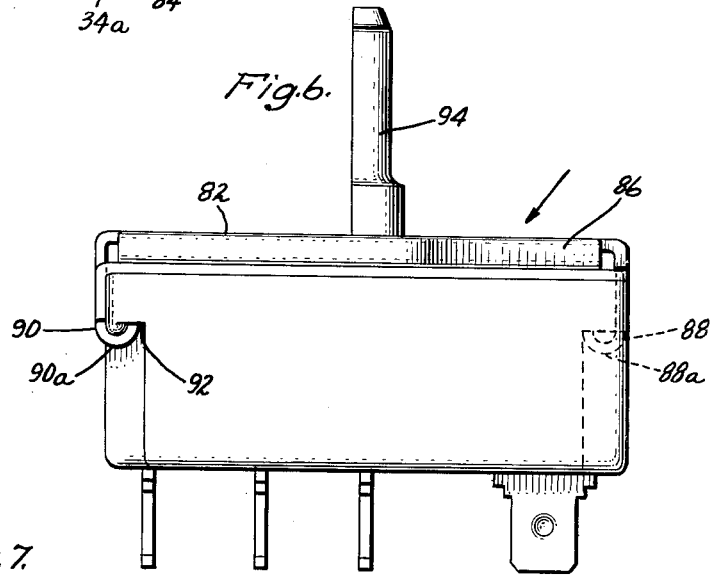
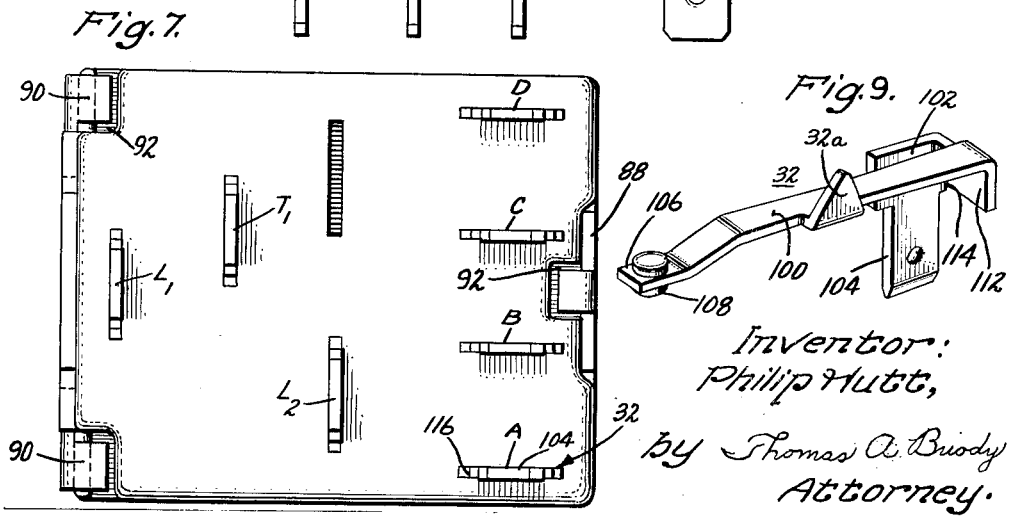
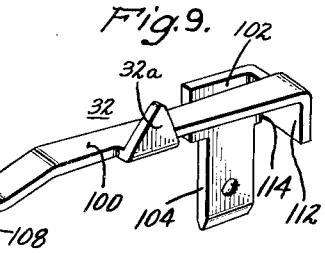
Inventor:
Philip Hutt,
by Thomas A. Briody
Attorney.

United States Patent Office 3,201,564
Patented Aug. 17, 1965

3,201,564
CONTROL SYSTEM FOR ELECTRIC COOKING OVENS
Philip Hutt, Milford, Conn., assignor to General Electric Company, a corporation of New York
Filed Dec. 11, 1962, Ser. No. 243,773
4 Claims. (Cl. 219—398)

This invention relates to a system for controlling the heating conditions of a domestic appliance, and more particularly to a system for controlling a plurality of heaters to operate an electric oven.

An important aim of the present invention is to provide an improved and simplified arrangement by means of which the heating elements of an appliance may be selectively connected to a power supply system to obtain different rates of heat generation desirable for expeditiously carrying out predetermined heating functions.

Another aim of this invention is to provide an improved arrangement whereby a plurality of heating elements for an electric oven are selectively interconnected in a novel manner to efficiently carry out baking, time baking, broiling and rotisserie operations.

A further object of my invention is to provide an improved heating control system which employs only two power lines and is very economical in cost.

Still another object of my invention is to provide an improved heating control system which employs a rotary switch of simplified construction to effectively control a plurality of heating elements.

In carrying out the present invention, in one form thereof it is applied to a control system for an electric oven utilized in a domestic appliance. For such a system the present invention provides a pair of power supply conductors, a two part first resistance element or unit, a second resistance element, and a switching means constructed and arranged so that when it is in one of its positions it connects the two parts of the first element in series with each other and the second element in parallel with the first element. The parallel connection of the two parts of the first element with the second element is connected across the supply conductors to obtain a baking heat condition within the oven. The switch means is further constructed and arranged so that in another of its positions it connects both parts of the first element in parallel across the supply conductors with the second element at zero potential. With the switch means in this latter position, a broiling heat condition is obtained within the oven. With such an arrangement, a simplified control system employing two power conductors is utilized to provide the baking and broiling heat conditions for an electric oven. Such a system is readily manufacturable and also very economical in cost.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings in which:

FIG. 1 is a diagrammatic representation of a heating system embodying one form of my invention, the system being shown in the off heat condition;

FIG. 2 is a view similar to FIG. 1, with the system shown in the baking heat condition;

FIG. 3 is a view similar to FIG. 1, with the system shown in the time bake heating condition;

FIG. 4 is a view similar to FIG. 1, with the system shown in the broiling heat and rotisserie heating conditions;

FIG. 5 is a plan view partially in section and partially broken away to show a switch constructed and arranged to control the oven heating elements in accordance with my invention;

FIG. 6 is a front elevation view of the switch of FIG. 5;

FIG. 7 is a bottom view of the switch of FIG. 5;

FIG. 8 is a plan view of the switch operating face of a cam embodied in the switch of FIG. 5;

FIG. 9 is a perspective view of a typical movable contact blade utilized in the switch of FIG. 5.

Referring to the drawings in detail, there is illustrated diagrammatically in FIGS. 1-4 an oven 10, which is in outline only, and which may be of the usual construction found in electric ranges and the like. In the lower portion of the oven 10, there is a resistance element 12 which serves principally as part of a baking means. Upwardly of the lower portion of the even 10 are resistance elements 14 and 16 which form part of a broiling means for the appliance.

To selectively control the heating conditions provided by the resistance elements 12, 14, and 16, the heating control system for oven 10 includes a rotary switch unit 18. The switch unit 18 is shown in FIGS. 5-8, and it includes a manually rotatable cam 20 which has cam tracks 20a–20d formed thereon for selectively operating two single-throw switches 22 and 24 and two double-throw switches 26 and 28. The switches 22, 24, and 26 and 28 include movable contacts 32, 34, 36 and 38 respectively, which are terminated at the load terminals A, B, C and D. In particular, movable contact 32 is terminated at load terminal A, movable contact 36 is terminated at load terminal B, movable contact 38 is terminated at load terminal C, and movable contact 34 is terminated at load terminal D. The load terminals A, B and C of switch 18 are connected to the oven heating elements 12, 14 and 16 through conductors 39, 41 and 43. Load terminal D is suitably connected to a motor that rotates a split within the oven, for providing rotisserie operation of the appliance.

In accordance with an important aspect of the present invention, as shown in FIGS. 1-4, the resistance elements 14 and 16 are connected at one of their ends to common terminal or tap 45, and at their other ends to separate terminals 47 and 49, respectively. Conductor 39 connects load terminal A to the common terminal 45. Conductor 41 connects load terminal B to the separate terminal 47 of resistance element 14. Conductor 43 connects load terminal C to the separate terminal 49 of resistance element 16. With this arrangement, the resistance element 12 is connected at its opposite ends to the separate terminals 47 and 49 respectively of the resistance elements 14 and 16. The purpose and advantages of such an arrangement of the resistance elements 12, 14 and 16 in the oven 10 and in the heating control system described, shall become readily apparent hereinafter.

As previously mentioned, the movable contacts 32, 34, 36, and 38 form part of the switches 22, 24, 26, and 28 respectively. Movable contact 32 of single-throw switch 22 is selectively cammed into and out of engagement with fixed contact 52. The movable contact 34 of single-throw switch 24 is selectively cammed into and out of engagement with fixed contact 54. Movable contact 36 of the double-throw switch 26 is selectively cammed into and out of engagement with fixed contact 56 or 66. The movable contact 38 of the double-throw switch 28 is selectively cammed into and out of engagement with fixed contact 58 or fixed contact 68.

The fixed contacts 52, 66, and 54 of the switches 22, 26, and 24 are connected together via reference point 70 to one side of the line at line terminal L2. The fixed contacts 56 and 58 of switches 26 and 28 are connected via reference point 72 to the other side of the line at line terminal L1. The fixed contact 68 of switch 28 is connected to a timed-line terminal T1 which is energized through a suitable timer switch (not shown) to provide a "timed baking" operation for the oven 10.

For an explanation of how the switch 18 operates and controls the connections of the resistance elements 12, 14 and 16, in accordance with the present invention, attention is now directed to FIGS. 1–4. As shown in the diagrammatic representation of FIGS. 1–4, the cam tracks 20a–20d of cam 20 are located on the left side of their associated movable contacts 32, 34, 36 and 38, and the movable contacts are internally biased toward their associated cam tracks. When the cam 20 of the switch 18 is in its "off" position (as shown in FIG. 1), cam track 20a is engaged by follower 32a of movable contact 32 and the internal biasing force of the blade of contact 32 causes it to maintain switch 32 in its open position. Cam track 20b then engages follower 36a of movable contact 36 to maintain switch 26 in an open position. Cam track 20c thereupon engages follower 38a of movable contact 38 to maintain switch 28 in an open circuit condition. Cam track 20d is engaged by the follower 34a of movable contact 34 and the internal biasing force of the blade of contact 34 causes it to maintain switch 24 in its open position. Of course, since the switches 22, 24, 26 and 28 are all open for this switch position, no current flows to the oven heating elements.

When cam 20 of the switch 18 is suitably rotated from its "off" position, it reaches the "bake" position for the oven. In this position, as shown in FIG. 2, cam track 20a allows movable contact 32 to remain in its open position, cam track 20b engages follower 36a of movable contact 36 to force or cam the movable contact into engagement with fixed contact 66, cam track 20c allows movable contact 38 to close into engagement with fixed contact 58, and cam track 20d allows movable contact 34 to remain in its open position. With the switch 18 in its "bake" position, as shown in FIG. 2, a circuit is thereupon established from line terminal L1 and contacts 58 and 38 of switch 28 to load terminal C. From the load terminal C the circuit passes via conductor 43 through the parallel combination of resistance element 12 and the series connection of elements 14 and 16. The other side of this parallel combination is connected through conductor 41 to load terminal B, and the circuit then passes through contacts 36 and 66 of switch 26 and through reference point 70 back to the other side of the line at terminal L2. For the broiling condition of the oven, it will thus be seen that the resistance elements 14 and 16 are connected in series to provide a relatively low heating level for baking operation. By way of example, let us suppose that a 236 volt two-wire supply is connected across line terminals L1 and L2, resistance elements 14 and 16 each have a rated wattage of 2500 w., and resistance element 12 has a rated wattage of 3000 w. With such an arrangement, when the switch 18 is in its "bake" position, the resistance elements 14 and 16 will operate at a combined effective wattage substantially equal to 1250 w. and resistance element 12 will operate at its rated wattage of 3000 w.

When the rotatable cam 20 of the switch 18 is suitably operated by rotation thereof to the "time-bake" position, as shown in FIG. 3, the cam tracks 20a, 20b, and 20d continue to maintain their respective switches 32, 36 and 34 in the same position as for "bake." However, when the cam 20 is rotated to this particular angular setting, cam track 20c operates movable contact blade 38 of the switch 28 out of engagement with fixed contact 58 and into closed engagement with fixed contact 68. A circuit is then established from the timed-line terminal T1 through contacts 68, 38 of the switch 28 to the load terminal C. From load terminal C the circuit is then completed, as for the "bake" position of the switch, through the parallel combination of the resistance element 12 and the series connected resistance elements 14 and 16. The other side of the parallel combination is connected through conductor 41 to load terminal B and through contacts 36 and 66 of switch 26 back to the other side of the line at terminal L2. It will thus be seen that for "time bake" operation of the oven 10, the resistance elements 14 and 16 are connected in series with each other so that they provide a relatively low heating level, as in the "bake" position. For "time bake" operation of oven 10, with a 236 volt power supply across line terminals T1 and L2 the same wattage characteristics are obtained at resistance elements 12, 14 and 16 as previously described for the "baking" position of switch 18. It will be understood further that with switch 18 in its "time bake" position, timed operation of the baking cycle is achieved by means of a device (not shown) connected to the terminal T1.

When the cam 20 of the switch 18 is rotatably operated to its "broil" position (shown in FIG. 4) the cam track 20a forces tahe movable contact 32 into engagement with fixed contact 52 to close switch 22. At the same time, cam track 20b of the switch cam 20 allows movable contact 36 of switch 26 to move to the left (in response to its internal biasing force) out of engagement with fixed contact 66 and into closed engagement with fixed contact 56. Cam track 20c of the cam 20 allows movable contact 38 of the switch 28 to move to the left (in response to its internal biasing force) out of engagement with fixed contact 68 and into closed engagement with contact 58. The cam track 20b continues to allow the movable contact 34 of switch 24 to remain in its open circuit position.

With the switch 18 in its "broil" position, as shown in FIG. 4 a circuit is provided from power terminal L1 to power terminal L2 through the parallel combination of switch contacts 56, 36, in series with conductor 41 and resistance element 14; and switch contacts 58, 38, in series with conductor 43 and resistance element 16. As shown in FIG. 4, one side of this parallel combination is connected at point 72 to line terminal L1 and the other side of the parallel combination is connected from common point 45 to the other side of the line at terminal L2 through conductor 39 and contacts 32, 52 of switch 22. As shown in FIG. 4, for the "broil" position, resistance element 12 is connected across both sides or legs of the parallel arrangement of the resistance elements 14 and 16 so that it is at zero potential.

With the switch 18 adjusted to the "broil" position and the heating control circuit thereby established as shown in FIG. 4, the resistance elements 14 and 16 are connected in parallel across the line terminals L1 and L2 and the resistance element 12 is at zero potential. With such an arrangement, using the previously described illustration of a 236 volt power supply connected across line terminals L1 and L2, resistance elements 14 and 16 each having a rated wattage of 2500 w., and a resistance element 12 rated at 3000 w., the parallel combination of the elements 14 and 16 would cause them to operate at their higher heating level and the overall wattage provided by them would be substantially equal to 5000 w. Because it is at zero potential, resistance element 12 would carry little or no current.

When the switch 18 is operated to the "rotisserie" position, as shown in FIG. 4 the circuit connections are the same as for the "broil" position except for the fact that movable contact 34 of switch 24 is closed into engagement with its associated fixed contact 54. A circuit is thereupon established to a motor capable of rotating a spit in the oven to provide rotisserie operation.

From the foregoing it will be seen that my new and improved heating control system as herein illustrated provides a simplified and effective means for operating an electric oven in such a manner as to provide baking, timed baking, broiling and rotisserie operations. It will be understood further that the system approach herein illustrated is economical in operation, and relatively inexpensive to manufacture. In addition, such a control system efficiently controls the oven heating elements and rotisserie motor with a switching means including only two single-throw and two double-throw switches.

In the diagrammatical representations of FIGS. 1–4, the switch 18 is shown schematically. One form of a rotary switch 18 which has been found to be particularly advantageous in carrying out the present invention is illustrated in FIGS. 5–9. The rotary switch 18 includes a housing 82 formed by a rectangularly configured recessed base 84 of molded phenolic or other suitable insulating material, and a cover plate 86. To facilitate the convenient attachment of these two housing members together, the plate 86 includes a bent over section 88 at the center of its right end (viewing FIG. 7) and two bent over sections 90 near the corners of its left end (viewing FIG. 7). The section 88 is wrapped around the right end of base 84 (as shown in FIG. 6) and the sections 90 are wrapped around the left end of base 84 (as shown in FIG. 6) so that the curled over extremities 88a and 90a of the sections 88 and 90 respectively (FIG. 7) cooperate with molded steps 92 of the base 84. The engagement of the extremities 88a and 90a with molded steps 92 thus securely attaches the cover plate 86 to base 84 in a simple manner for holding the switch parts in their assembled positions.

For selectively operating the various circuits controlled by the switch 18, a shaft 94 is rotatably mounted within housing 82. (See FIG. 6.) Shaft 94 extends outwardly from the housing 82 through a suitable bearing aperture. The inner end of shaft 94 (FIG. 8) is suitably connected to the switch operating rotary cam (FIG. 8) to facilitate the manual selection of the desired operating condition for the oven. The structure and mode of operation of the cam 20 has been previously set forth, and its actuating face with the various cam tracks 20a–20d formed thereon, is shown in FIG. 8.

Turning now to a further consideration of the interior of switch 18, as shown in FIG. 5 there are four movable spring contacts 32, 34, 36, and 38 which form part of their respective switches 22, 24, 26 and 28. The contacts 32 and 36 are arranged on one side of the shaft 94 and the contacts 34 and 38 are arranged on the opposite side of the shaft 94.

The four spring contacts 32, 34, 36, and 38 are all fixed in the switch housing 82 at the right end of base 84 (viewing FIG. 5). This arrangement provides each spring contact with a cantilever action, while the force or load applied to the cantilever is determined by the cam 20 engaging a cam follower on each movable contact adjacent the center thereof (such as, followers 32a, 34a and 38a of contacts 32, 34 and 38 shown in FIG. 5). The fixed contacts are arranged in the left end of the base 84 (viewing FIG. 5) opposite the fixed ends of the movable spring contacts. There are three fixed contact member in all, one of these being a single piece metallic member M which includes fixed contacts 52, 66, 54, and terminal L2 (see also FIG. 1). Another of the fixed contact members is a single piece metallic member N which includes fixed contacts 56 and 58 and terminal L1 (see FIGS. 1 and 5). The third fixed contact member O includes the single fixed contact 68 and terminal T1. The contact member M which includes the fixed contacts 52, 66 and 54 has a generally E-shaped portion which is arranged on the inner side of the bottom wall 84a of base 84 and supports fixed contact buttons which are engaged by the contact buttons formed on the free ends of movable contacts 32, 36 and 34. The contact member N which includes fixed contacts 56 and 58 is arranged above the free ends of the two inner spring contacts 36 and 38 (FIG. 5) and has a T-shaped portion which supports fixed contact buttons engaged by the movable contact buttons of contacts 36 and 38. The fixed contact 68 is arranged on the inner side of bottom wall 84a of base 84 and has a fixed contact button for engagement by movable contact 38. With such an arrangement, the uppermost spring contact 32, shown in FIG. 5, is a single-throw contact of the single-pole single-throw switch 22. The movable contact 36 which is second from the top, as shown in FIG. 5, is a double-throw contact of the single-pole double-throw switch 26. The movable contact 38, which is second from the bottom viewing FIG. 5, is a double-throw contact of the single-pole double-throw switch 28. The movable contact 34, which is shown at the bottom viewing FIG. 5, is a single-throw contact of the single-pole single-throw switch 24.

For further explanation of the structure of the movable spring contacts 32, 34, 36, and 38, attention is now directed to FIG. 9. As shown therein for contact 32 each movable contact includes a spring blade 100, a fixed intermediate portion 102, and an integral tab type terminal 104. The free end, or end 106, opposite the fixed portion 102 of the contact carries a silver contact button 108 which is adapted to make engagement with silver slugs on the fixed contacts. The cam follower 32a, mentioned previously, is merely a tab that extends from one side edge of the blade 100 and is upwardly directed (viewing FIG. 9) to engage with one of the cam tracks of cam 20 (FIG. 8). The end of the spring blade 100 that is remote from the silver contact button 108 is bent downwardly at a right angle as at 112 and the tab terminal 104 is an extension of one side edge of the portion 112. Actually, the terminal 104 is connected to the portion 112 at right angle bend 114 so that the terminal 104 is perpendicular to the plane of the spring blade 100, while being generally parallel with one side edge of the blade. The spring contacts are assembled in the base 84 by inserting the terminals through suitable slots (as shown in FIG. 7), and the fixed portion 102 is staked therein by forming over the edges as at 116.

For controlling or detenting the rotation of the switch actuating cam 20 of switch 18, as shown in FIG. 5, a pair of elongated spring members 120 and 122 have been provided. The member 122 is of elongated blade-like configuration and has a curved projection or bend 124 formed on the center thereof. Member 120 is a flat blade-like strip, and serves as a backup member for the member 122. Both of the members 120 and 122 are fitted in side-by-side fashion into appropriate recesses in insulating base 84, as shown in FIG. 5, with the projection 124 facing inwardly toward the axis of the cam. The back side 126 of cam 20 has an annular hub 128 integrally formed upon it. Hub 128 includes a radially arranged series of detent notches 130 formed on its periphery. The projection 124 of member 122 frictionally engages the periphery of hub 128 and cooperates in spring-like fashion with the notches 130, as shown in FIG. 5, to index or control the rotary movement of cam 20 as well as its associated shaft 94.

It will now, therefore, be seen that my improved heating control system as set forth above provides a novel and effective means for operating an electric oven.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In a control system for an electric oven, supply conductor means; a first resistance element having at least two parts; a second resistance element; and means including first, second, and third switches for selectively connecting the resistance elements in circuit with the supply conductor means; a first circuit for obtaining a baking heat condition within said oven, said first circuit including across said supply conductors a series arrangement of the two parts of said first resistance element in parallel combination with said second element, and said first and second switches in series with said parallel combination; and a second circuit for obtaining a broiling heat condition within said oven, said second circuit including across said supply conductor means said third switch connected to a point common to both parts of said first element, and a parallel combination of said first switch and one part of said first resistance element with said second switch and the other part of said first resistance element, said second resistance element being connected essentially at zero potential in said second circuit.

2. In a control system for an electric oven, a plurality of supply terminals, a first resistance unit having two elements with a tap therebetween, a second resistance unit connected to the ends of said elements remote from said tap and being thereby in parallel circuit relation with said first unit as a whole, and switch means for selectively energizing said resistance units from said supply terminals to obtain differing conditions of heat generation, said switch means having at least an off position, a first heat position and a second heat position, said switch means including contact means closed in said first heat position for energizing the parallel connected first and second units across said supply terminals, and contact means closed in the second heat position for connecting said two elements of said first unit in parallel across said supply terminals, said last mentioned contact means including three pairs of contacts one pair of which is connected between said tap and one of said supply terminals and the other two of which are connected respectively between at least one other supply terminal and the ends of the elements remote from said tap.

3. In a control system for an electric oven, a pair of main supply terminals and an additional supply terminal, a first resistance unit having two elements with a tap therebetween, a second resistance unit connected to the ends of said elements remote from said tap and being thereby in parallel circuit relation with said first unit as a whole, and switch means for energizing said resistance units from said supply terminals, said switch means having an off position, a first heat position, a second heat position, and a third heat position, said switch means including first contact means closed in said first heat position for energizing the parallel connected first and second units across said supply terminals, said first contact means including two pairs of contacts each pair of which is connected between an end of one of the elements of the first unit remote from said tap and one of said supply terminals, second contact means closed in said second heat position for energizing the parallel connected first and second units across said supply terminals for a predetermined time, said second contact means including one of said pair of contacts of said first contact means connected between an end of one of the elements of the first unit remote from said tap and one of said supply terminals, and another pair of contacts connected between the end of the other one of the elements of the first unit remote from the tap and said additional supply terminal, and third contact means closed in the third heat position for connecting said two elements of said first unit in parallel across said supply terminals, said third contact means including three pairs of contacts one pair of which is connected between said tap and one of said supply terminals and the other two of which are connected respectively between the other supply terminal and the ends of the elements remote from said tap.

4. In a control system for an electric oven, a pair of main supply terminals and an additional supply terminal, a first resistance unit having two elements with a tap therebetween, a second resistance unit connected to the ends of said elements remote from said tap and being thereby in parallel circuit relation with said first unit as a whole, and switch means for energizing said resistance units from said supply terminals, said switch means having an off position, a first heat position, a second heat position, a third heat position, and a fourth position, said switch means including first contact means closed in said first heat position for energizing the parallel connected first and second units across said supply terminals to provide baking heat for said oven, said first contact means including two pairs of contacts each pair of which is connected between an end of one of the elements of the first unit remote from said tap and one of said supply terminals, second contact means closed in said second heat position for energizing the parallel connected first and second units across said supply terminals for a predetermined time to provide a timed baking heat for said oven, said second contact means including one said pair of contacts of said first contact means connected between an end of one of the elements of the first unit remote from said tap and one of said supply terminals, and another pair of contacts connected between the end of the other one of the elements of the first unit remote from the tap and said additional supply terminal, third contact means closed in the third heat position for connecting said two elements of said first unit in parallel across said supply terminals to provide broiling heat for said oven, said third contact means including three pairs of contacts one pair of which is connected between said tap and one of said supply terminals and the other two of which are connected respectively between the other supply terminal and the ends of the elements remote from said tap, and fourth contact means closed in the fourth position for energizing a motor to provide rotisserie operation in said oven.

References Cited by the Examiner

UNITED STATES PATENTS

| | | | |
|---|---|---|---|
| 2,388,839 | 11/45 | Fry | 219—398 |
| 2,515,427 | 7/50 | Schulze | 219—398 |
| 2,675,455 | 4/54 | Richardson | 219—398 |
| 2,778,914 | 1/57 | Vallorani | 219—398 |

RICHARD M. WOOD, *Primary Examiner.*